United States Patent

Lee

[15] 3,688,057

[45] Aug. 29, 1972

[54] ERASURE PREVENTION CONTROL FOR MAGNETIC TAPE REELS HAVING A SAFETY RING TO PREVENT INSERTION OF A FILE PROTECT RING

[72] Inventor: Joseph L. Lee, 12019 Edgewater Dr., Lake Park, Fla. 33403

[22] Filed: July 21, 1970

[21] Appl. No.: 56,780

[52] U.S. Cl. ............................................179/100.2 D
[51] Int. Cl. ............................................G11b 15/04
[58] Field of Search................179/100.2 D; 335/284; 274/11 E, 11 F; 242/71.8; 226/91, 92

[56] References Cited

UNITED STATES PATENTS

| | | | |
|---|---|---|---|
| 2,612,565 | 9/1952 | Heller | 179/100.2 D |
| 3,417,387 | 12/1968 | Rayfield | 179/100.2 D |
| 2,594,848 | 4/1952 | Begun | 179/100.2 D |
| 3,259,712 | 7/1966 | Libby | 179/100.2 D |
| 2,761,017 | 8/1956 | Camras | 179/100.2 D |
| 3,199,093 | 8/1965 | Cheney | 179/100.2 D |
| 3,474,753 | 10/1969 | Weyrich et al | 179/100.2 D |

*Primary Examiner*—Bernard Konick
*Assistant Examiner*—Alfred H. Eddleman
*Attorney*—Colton & Stone

[57] ABSTRACT

A safety ring is disclosed for insertion in a hub groove of a conventional magnetic tape reel to prevent insertion, in the groove, of a conventional file protect ring in order to prevent inadvertent erasure of the information recorded on the tape. A tool is required to remove the safety ring from the groove thereby preventing inadvertent or unthinking removal of the safety ring.

10 Claims, 5 Drawing Figures

INVENTOR
JOSEPH L. LEE

BY Colton & Stone
ATTORNEYS.

ERASURE PREVENTION CONTROL FOR MAGNETIC TAPE REELS HAVING A SAFETY RING TO PREVENT INSERTION OF A FILE PROTECT RING

BACKGROUND OF THE INVENTION

Magnetic tape is presently in wide use as a storage medium for employment in conjunction with data processing equipment, tape controlled machinery and the like. A prominent advantage of magnetic tape is its reuseability since previously encoded information may be erased and new information recorded thereon. This advantageous feature has its drawback since it is often desired to more or less permanently record information on the magnetic tape for periodic retrieval, permanent storage and the like.

The approach presently used in the art is an attempt to prevent erasure of the encoded information by establishing elaborate systems of labels, rules and procedures. The effectiveness of these systems depend on the conscientiousness of all personnel handling the tape reels. Inexorably, following Murphy's Law, that which can possibly go awry does so and a tape having valuable information thereon is erased or written over.

The prior art has recognized this problem and proposals have been made to provide arrangements to minimize the frequency of these minor disasters. Exemplary proposals offered by the prior art are found in U.S. Pat No. 3,199,093; No. 3,335,410 and No. 3,474,753. If implemented, these proposals would go a long way in overcoming this problem. None of these proposals has, however, been implemented on the scale necessary to provide relief to any substantial segment of the data processing industry. The prime reason is that all of the proposals found in the prior art require substantial modification of the encoding devices and/or the reels. While such modifications might be possible for the next generation of data processing equipment, there presently exists a real and unsatisfied need for means to prevent erasure of magnetic tape which is compatible with existing encoding devices and storage reels.

SUMMARY OF THE INVENTION

It is an object of this invention to provide a simple and expeditious means to prevent erasure of magnetic tape stored on a reel which is compatible with existing encoding devices and reels Another object of this invention is to provide a conventional magnetic tape reel having means attached thereto to prevent erasure of information on the tape.

A further object of the invention is to provide a safety ring for insertion in a groove presently existing on conventional magnetic tape reels to prevent insertion therein of a conventional file protect ring.

In summary, this invention comprises an arrangement for preventing erasure of information encoded on magnetic tape stored on a more-or-less conventional reel having an annular channel therein for receiving a readily removable file protect ring filling a substantial part of the channel for manipulating a switch actuator of an encoding device and thereby actuating the encoding device wherein the arrangement includes a safety ring positionable in the channel and occupying less space therein than is necessary to manipulate the switch actuator and preventing insertion of a file protect ring in the channel.

DETAILED DESCRIPTION OF THE PREFERRED EMBODIMENTS

Figure 1:
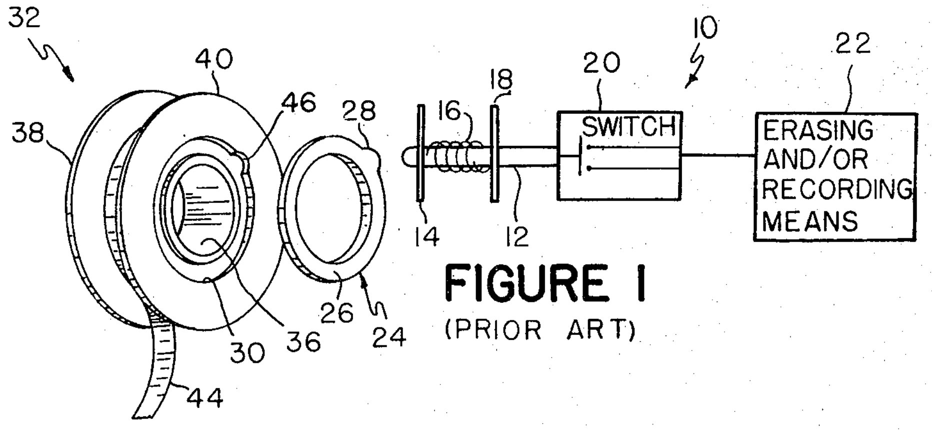
FIGURE 1 (PRIOR ART)
FIG. 1 is an exploded isometric view of a conventional magnetic tape reel, file protect ring and encoding device.

Referring to FIG. 1, there is schematically illustrated a conventional encoding device 10 comprising a plunger or switch actuator 12 extending through a cabinet wall 14 and biased outwardly by a spring 16 reacting against a stop member 18. The switch actuator 12 is operatively connected to an activating switch 20 for energizing an erasing and/or recording means 22. The erasing means 22 is energized upon depression of the switch actuator 12 by contact with a conventional file protect ring 24. Presently used file protect rings 24 comprise an annular member having a generally planar face 26 for engagement with the plunger 12 and a tab 28 for removing the ring 24 from an annular channel or groove 30 in a conventional tape reel 32.

Figures 2, 3, 4, 5:
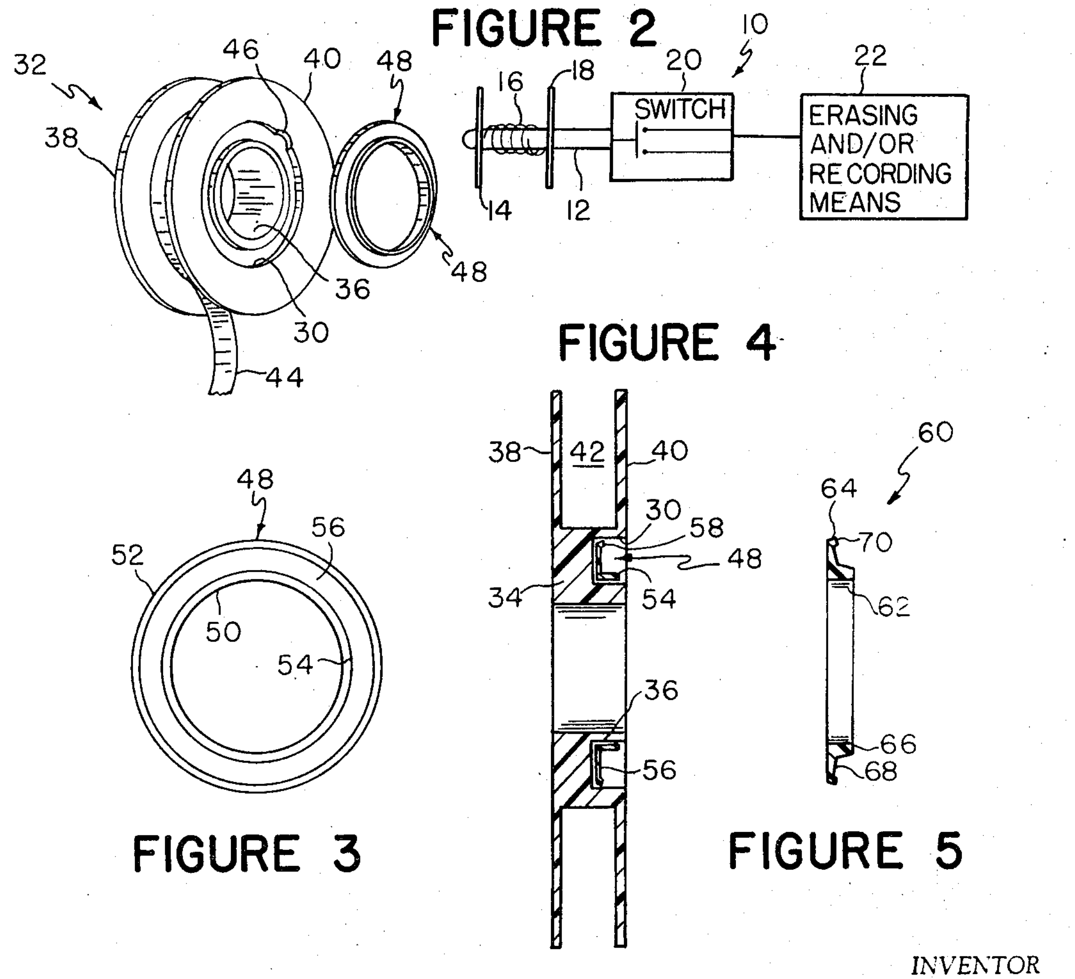
FIG. 2 is an exploded isometric view, similar to FIG. 1, illustrating the safety ring of this invention.
FIG. 3 is a front elevational view of the safety ring of this invention.
FIG. 4 is a cross section of a conventional magnetic tape reel illustrating the ring of this invention inserted therein.
FIG. 5 is a cross section of another embodiment of the invention.

Referring also to FIG. 4, the reel 32 comprises a hub 34 having an opening 36 therein for receiving a drive spindle (not shown) of the coding device 10. A pair of flanges 38, 40 extend from the hub 34 and provide therebetween a storage area 42 for a spirally wound magnetic tape 44. The reel 32 may be made of any suitable material and is typically either plastic or a plastic-metal assemblage. The reel 32 is typically provided with a recess 46 communicating with the channel 30 to receive the tab 28 of the file protect ring 24 so that the ring 24 and reel 32 present a substantially flush side when assembled.

When encoding with conventional data processing equipment, the file protect ring 24 is inserted into the channel 30. The reel 32 is then placed on the drive spindle. The switch actuator 12 is adjacent the drive spindle and engages the planar face 26 of the file protect ring thereby activating the switch 20 and energizing the recording means 22. Upon rotation of the drive spindle and operation of the encoding means 10, information is encoded on the magnetic tape 44 in a conventional manner. If it is desired to play the tape 44, the reel 32 is removed from the drive spindle and the file protect ring 24 is removed, as by pulling on the tab 28. The reel 32 is then repositioned on the drive spindle and the equipment is turned on.

The channel 30 is sufficiently deep to accommodate the throw of the plunger 12 without actuating the switch 20. Consequently, the recording means 22 is not activated thereby allowing the tape 44 to be played, stored and replayed as many times as desired without erasing the information thereon.

In accordance with the practice now widely in use, labels are affixed to the reel 32 indicating that the tape 44 is not to be erased. Such a label obviously indicates that the tape should not be erased and does nothing to prevent a careless or inattentive person from placing a file protect ring in the channel 30 and inserting a reel on a drive spindle for recording. In this manner valuable information may be lost which can be replaced only by substantial and needless expense.

In the use of this invention, neither the encoding nor the reading operation presently in use is affected or modified. After the tape 44 has been encoded in a conventional manner and the file protect ring 24 removed, a safety ring 48 of this invention is inserted into the channel 30 to protect the encoded information against inadvertent erasure. The safety ring 48 has two major equally important characteristics. The ring 48 is shaped or sized not to depress the switch actuator 12 sufficiently to activate the switch 20. The ensures that the erasing means 22 is inoperative when the reel 32 is positioned for reading on the drive spindle of the encoding device 10. Thus, a magnetic tape reel equipped with this invention may be read by conventional equipment without modification.

The second major characteristic of the safety ring 48 is that it prevents insertion of the file protector ring 24 in the channel 30. The safety ring 48 thus prevents an individual from erasing or writing over valuable information on a reel equipped with this invention.

The safety ring 48 advantageously has several preferred characteristics. The ring 48 is desirably tightly lodged in the channel 30 and cannot slip axially toward the open side thereof. When so constructed, the ring 48 cannot fall out of the channel 30 nor inadvertently depress the switch actuator 12. The safety ring 48 is desirably removable from the channel 30 by the use of a sharp pointed tool such as a screw driver or knife. Consequently, the safety ring 48 may be removed only by one intentionally so doing. Suitable procedure may be established for the handling of reels of this invention to authorize only certain specified people, such as a supervisor or tape librarian, to remove the safety rings 48.

To these ends, the safety ring 48 of FIGS. 2–4 comprises an annular body having an inner diameter 50 and an outer diameter 52. The ring 48 includes a maximum thickness section 54 adjacent the inner diameter 50 to partially obstruct the channel 30 and thereby prevent insertion of the file protect ring 24 therein. The maximum thickness section 54 is preferably flush with the face of the reel 32 when the ring 48 is in place. The ring 48 also includes a much thinner section 56 away from the inner diameter 50 to receive the plunger 12 without activating the switch 20. The thinner section 56 preferably comprises a major portion of the radial extend of the ring 48 to accommodate the switch actuator 12 without binding. Most conventional data processing equipment is designed to position the switch actuator 12 off-center in the channel 30 toward the outer diameter thereof. If the data processing equipment is of a type having the switch actuator 12 off-center in the channel 30 toward the inner diameter thereof, it is desirable to place the maximum thickness section adjacent the outer diameter of the ring.

Immediately adjacent the outer diameter 52 is a lip 58 which serves to wedge the ring 48 in the channel 30. It will be apparent that the size of the lip 58 is not sufficient to depress the switch actuator 12. The embodiment of FIGS. 2–4 is generally L-shaped in cross section and is rigid in the thickness direction to prevent the file protect ring 24 from compressing the safety ring 48 and thereby lodging in the channel 30. The safety ring 48 may be readily manufactured in any suitable manner, as by injection molding.

There is shown in FIG. 5 another safety ring 60 of similar construction having an inner diameter 62, an outer diameter 64, an area 66 of maximum thickness, an area 68 which is much thinner and a lip 70 to wedge the ring 60 in the channel 30. It will also be apparent that the safety ring of this invention may comprise a simple cylindrical section which may be press fit on the inner diameter of the groove 30 or in the outer diameter thereof depending on the design of the associated data processing equipment.

I claim:

1. In a magnetic tape reel of the type comprising a central opening for receiving a spindle, an annular channel defined by smooth generally circular sidewalls concentric with the opening and a smooth bottom wall generally perpendicular to the sidewalls for receiving a switch actuator having a path of movement between a switch actuating position generally flush with the reel side and a switch non-actuating position in the channel and for gripping a file protect ring for positioning the switch actuator in the switch actuating position, the improvement comprising means, gripped by the smooth channel walls and positioned in the channel for preventing insertion of the file protect ring in the channel and providing an annular groove for receiving the switch actuator in the switch non-actuating position.

2. The combination of claim 1 wherein the receiving means defines an annular recess for accommodating the switch actuator.

3. The combination of claim 1 wherein the preventing means comprises an annular ring removably received in the channel.

4. The combination of claim 3 wherein the ring includes means for wedging the ring in the channel.

5. The combination of claim 3 wherein the ring, in the thickness direction, is rigid.

6. The combination of claim 3 wherein the ring is of a first thickness adjacent one diameter thereof and a lesser thickness adjacent the other diameter thereof.

7. The combination of claim 6 wherein the first thickness is adjacent the inner diameter.

8. The combination of claim 7 wherein the ring is generally L-shaped in cross section.

9. An arrangement for preventing erasure of information encoded on magnetic tape stored on a reel of the type having an opening therethrough for receiving a spindle, an annular channel defined by smooth generally circular sidewalls concentric with the opening and a smooth bottom wall generally perpendicular to the sidewalls for receiving a switch actuator having a path of movement between a switch non-actuating position in the channel and a switch actuating position and for gripping a readily removable file protect ring filling a substantial part of the channel for positioning the actuator in the switch actuating position, the arrangement comprising an annular safety ring, grippable by the smooth channel walls and positioned in the channel, having a maximum thickness adjacent the inner diameter thereof for preventing insertion of the file protect ring in the channel and of a lesser thickness adjacent the outer diameter thereof for accommodating the switch actuator in the switch non-actuating position, the portion of lesser thickness comprising a major part of the radial dimension of the ring.

10. In combination, a magnetic tape reel comprising a central opening for receiving a spindle, an annular channel defined by smooth generally circular sidewalls concentric with the opening and a smooth bottom wall generally perpendicular to the sidewalls for receiving a switch actuator having a path of movement between a switch actuating position generally flush with the reel side and a switch non-actuating position in the channel and for receiving a file protect ring for positioning the switch actuator in the switch actuating position; a magnetic tape encoding device including a spindle for receiving a magnetic tape reel, means for erasing and/or recording information on a magnetic tape, switch means for energizing the erasing and/or recording means including a switch actuator having a path of movement between the switch actuating position and the switch non-actuating position; the improvement comprising means, gripped by the smooth channel walls and positioned in the channel, for preventing insertion of the file protect ring in the channel and providing an annular groove for receiving the switch actuator in the switch non-actuating position.

* * * * *